United States Patent
Coleman et al.

(10) Patent No.: US 11,163,745 B2
(45) Date of Patent: Nov. 2, 2021

(54) STATISTICAL FINGERPRINTING OF LARGE STRUCTURE DATASETS

(71) Applicant: LiveRamp, Inc., San Francisco, CA (US)

(72) Inventors: Arthur Coleman, Carmel Valley, CA (US); Tsz Ling Christina Leung, Foster City, CA (US); Martin Rose, Superior, CO (US); Chivon Powers, Burlingame, CA (US); Natarajan Shankar, Pleasanton, CA (US)

(73) Assignee: LiveRamp, Inc., San Francisco, CA (US)

( * ) Notice: Subject to any disclaimer, the term of this patent is extended or adjusted under 35 U.S.C. 154(b) by 0 days.

(21) Appl. No.: 16/650,610

(22) PCT Filed: Sep. 7, 2018

(86) PCT No.: PCT/US2018/049910
§ 371 (c)(1),
(2) Date: Mar. 25, 2020

(87) PCT Pub. No.: WO2019/070363
PCT Pub. Date: Apr. 11, 2019

(65) Prior Publication Data
US 2021/0200735 A1   Jul. 1, 2021

Related U.S. Application Data

(60) Provisional application No. 62/568,720, filed on Oct. 5, 2017.

(51) Int. Cl.
*G06F 16/22* (2019.01)
*G06F 16/28* (2019.01)

(52) U.S. Cl.
CPC ........ *G06F 16/2282* (2019.01); *G06F 16/221* (2019.01); *G06F 16/285* (2019.01)

(58) Field of Classification Search
CPC ............. G06F 11/1469; G06F 2201/84; G06F 16/951; G06F 16/214; G06F 16/24556;
(Continued)

(56) References Cited

U.S. PATENT DOCUMENTS

| 7,930,546 B2 | 4/2011 | Rhoads et al. |
| 8,099,415 B2 | 1/2012 | Luo et al. |

(Continued)

OTHER PUBLICATIONS

Whittaker, "When Stolen Data Turns Up on the Dark Web, This Tech Can Find It Fast," ZDNet, www.zdnet.com/article/stolen-data-on-the-data-dark-web-matchlight/ (Jun. 3, 2015).
(Continued)

*Primary Examiner* — Hung T Vy

(57) ABSTRACT

A system and method for statistical fingerprinting of structured datasets begins by dividing the structured database into groups of data subsets. These subsets are created based on the structure of the data; for example, data delineated by columns and rows may be broken into subsets by designating each column as a subset. A fingerprint is derived from each subset, and then the fingerprint for each subset is combined in order to create an overall fingerprint for the dataset. By applying this process to a "wild file" of unknown provenance, and comparing the result to a data owner's files, it may be determined if data in the wild file was wrongfully acquired from the data owner.

18 Claims, 9 Drawing Sheets

(58) Field of Classification Search
CPC .... G06F 16/278; G06F 16/285; G06F 16/221; G06F 16/2282
USPC ........................................................ 707/737
See application file for complete search history.

(56) References Cited

U.S. PATENT DOCUMENTS

| | | |
|---|---|---|
| 8,250,085 B1 | 8/2012 | Satish |
| 8,359,472 B1 | 1/2013 | Ren et al. |
| 9,130,972 B2 | 9/2015 | Barkan et al. |
| 9,183,200 B1 * | 11/2015 | Liu .................... G06F 16/2282 |
| 9,330,095 B2 | 5/2016 | Fedorenko et al. |
| 9,514,312 B1 | 12/2016 | Antoun et al. |
| 2006/0150153 A1 | 7/2006 | Altman |
| 2007/0088528 A1 * | 4/2007 | Miller .................. G05B 23/024 |
| | | 702/185 |
| 2012/0011153 A1 * | 1/2012 | Buchanan ............. G06F 21/552 |
| | | 707/771 |
| 2014/0279956 A1 | 9/2014 | Trimble et al. |
| 2016/0253377 A1 * | 9/2016 | Ford .................. G06F 16/2453 |
| | | 707/768 |

OTHER PUBLICATIONS

Shu et al., "Fast Detection of Transformed Data Leaks," IEEE Trans. on Information Forensics and Security, vol. 11, No. 3 (Mar. 2016).

* cited by examiner

Fingerprinting Test flow for a Single Dataset

Fingerprint Comparison Processing Steps

```
"colName": "dibe8201_8201",
"TotalRows": 2461?,                    ← One Sample Chi Square metrics for
"chiSquaredGOF": 0,                        Categorical data, 401
"chiSquaredProb": 1.0,
"freq_mean": 230.6,
"freq_median": 94.0,
"freq_mode": " default = 0",           ← Base statistics of data subset, 402
"freq_max": 5022,
"freq_min": 94,
"fill_rate": 0.759531935641151,
"sourceFileName": "Acxiom_201706_770841to1",
"timestamp": "2017-__-07 14:08:22.977767",   ← Timestamp and data source, 403
"numFactors": 20,
"ActualDistribution": {
    "NA": 0.20464680643568494,
    "1": 0.008819275150333171,
    "2": 0.005413486856031692,
    "3": 0.0103_0799_89946368,
    "4": 0.01253_120705346985,
    "5": 0.01943_42044531123,
    "6": 0.01352_85372988785,
    "7": 0.031976_717373_5886,         ← Factor distribution in data
    "8": 0.015846_2881521209,              subset, 404
    "9": 0.049731_3812774257,
    "10": 0.02632_620185275476,
    "11": 0.04843_81228668942,
    "12": 0.08574_164968182024,
    "13": 0.13895_60653339834,
    "14": 0.1881_76164472615,
    "15": 0.1286_768929627825,
    "16": 0.014_48902974158947,
    "17": 0.01_733138306517146,
    "18": 0.0_121484193076548,
    "19": 0.0_0796359499431717
},
"UpdatedchiSquaredGOF": 0,             ← Two sample comparison data,
"UpdatedchiSquaredProb": 1.0               Not currently populated, 405
```

STATISTICAL FINGERPRINTING OF LARGE STRUCTURE DATASETS

TECHNICAL FIELD

The field of the invention is data watermarking and fingerprinting, particularly statistical fingerprinting of structured large data sets.

BACKGROUND ART

Intentional or unintentional leakage of proprietary data files (e.g., files of type .csv, .sql, .txt, among others) or textual data in JSON or XML data feeds represents a significant potential for damage. Existing solutions are available to protect against loss while data reside behind corporate firewalls. Solutions like the secure HTTP or SSL protocols protect against the risk of loss when data, whether as a file or as a data feed, leaves the firewall and traverses the Internet to legitimate receptors (described herein as Trusted Third Parties, or TTPs). Other solutions exist to assert and document file ownership once files are being used outside the original source's (Data Owner's) firewall. These data watermarking and fingerprinting solutions are desirable because they provide evidence of ownership in cases of theft or other loss.

Data watermarking and fingerprinting constitute two categories of procedures for demonstrating data file ownership. These two approaches are not always mutually exclusive, but a general distinction obtains. File watermarking involves making changes to the data, normally minor, to create unique patterns that are difficult for a user to recognize. Altering the least significant digit of a numeric (continuous) variable according to a specified rule is a simple example. Creating a fingerprint of a data file does not involve alterations to the data; rather, characteristics of the data are used to create a signature that can be recognized after the fact. A simple fingerprint might be predicated on a statistical characterization of variables in a file. A fingerprint is technically a subset or substitute of watermarking, therefore fingerprint methods are also referred to as content-based zero watermark techniques. They are based on content of the data file and do not involve any data alteration, hence the reference to "zero watermark."

Data fingerprinting is a known area of scientific work across various file formats, including text documents, audio, and video. Data fingerprinting of databases is also a known area of work. Fingerprinting is an active area in academic research in particular, with institutions like Stanford University publishing a great deal of work in document-fingerprinting research using n-gram based fingerprinting approaches. In the Stanford research, the technique involves converting texts and documents into shorter text strings that can then be used as unique identifiers for the larger text or document. This work has also been extended to forms that contain personally identifiable information (PII), where the algorithm can encode and retrieve sensitive information such as Social Security Numbers. By detecting sensitive information during network file transmission, the document security is enforced. Many domain specific extensions have also been reported. In documents that contain biological data, a probabilistic method of data fingerprinting has been used for file comparison.

Despite the work that has been done in this field, there remains a need for improvements in document fingerprinting, particularly with respect to large text-based data sets where the text is highly organized, such as databases, data feeds, and the like.

References mentioned in this background section are not admitted to be prior art with respect to the present invention.

SUMMARY OF THE INVENTION

The present invention uses canonical statistical methods to define the internal structure of the data in a data set to extract the descriptive statistical patterns present. Defining the statistical nature of a large dataset or its component subsets is referred to here as statistical fingerprinting. Statistical fingerprinting is a way of statistically establishing a dataset's identity. A statistical identity is established as a set of fingerprint metrics that uniquely characterizes the dataset. Datasets with different inherent characteristics will have different statistical patterns. Fingerprints can be extracted from large, structured datasets that are composed of smaller datasets, referred to herein as subsets. Structured datasets often manifest in tabular form and their lowest atomic component is a column of data. A column of data in a database is hence one example of a subset. Complete columns can be added or removed and a collection of rows containing all columns can be added or removed. The metrics that define fingerprints constitute a unique and compressed signature that can be used for identification and comparison of a dataset with a similarly derived fingerprint from another dataset. Dataset pairs with matched fingerprint metrics, or data subsets with matched fingerprint metrics, can be statistically asserted to be the same dataset or as being the same subset or that that they have the same pedigree. The statistical fingerprints of the dataset (or a relevant subset thereof) in a data subset for which a leak may be suspected, such file being referred to herein as a Wildfile, can be computed and statistically compared to the statistical fingerprints of corresponding data in a data provider's reference file, or any reference file for that matter.

Although the examples used herein pertain to a specific type of database containing specific types of data elements arranged in a customary columnar order, the invention in its various implementations is not limited to such a database, these particular data elements, or this particular structure.

These and other features, objects and advantages of the present invention will become better understood from a consideration of the following detailed description of the preferred embodiments and appended claims in conjunction with the drawings as described following:

BRIEF DESCRIPTION OF DRAWINGS

FIG. 5 is a depiction of a typical fingerprint representation of columnar data according to an implementation of the invention.

FIG. 6 is a series of three time-based snapshots of statistical fingerprints according to an implementation of the present invention.

DESCRIPTION OF EMBODIMENTS

Figure 1:
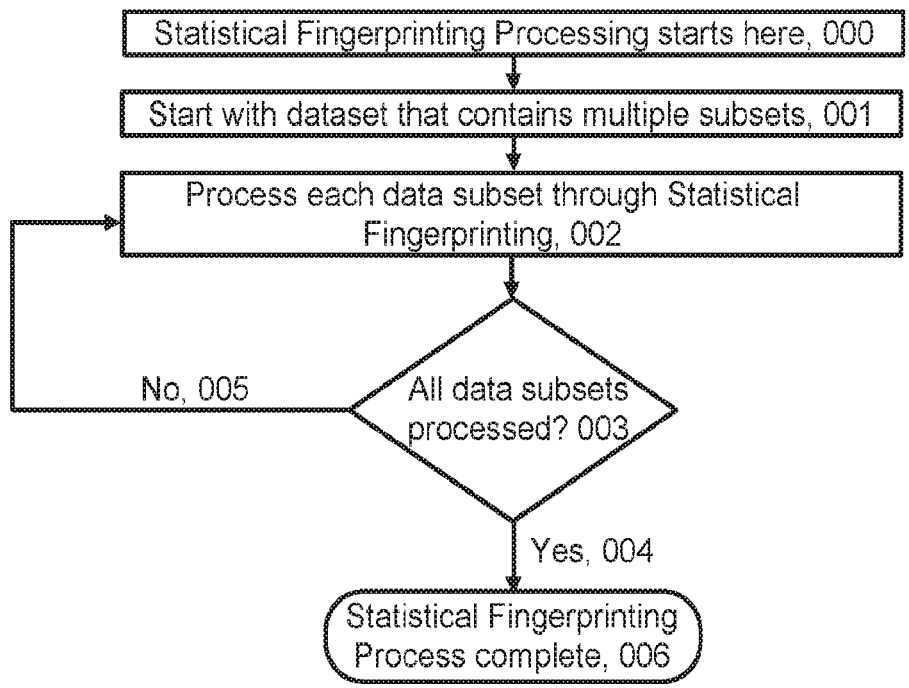
FIG. 1 is a flow chart depicting the overall statistical fingerprinting process according to an implementation of the invention.

The present invention will be described below with reference to one or more specific implementations; it is understood, however, that these implementations are not limiting to the invention, and the full scope of the invention is as will be set forth in any claims directed to the invention in this or a subsequent application directed to the invention.

Statistical fingerprinting of structured datasets is a mechanism to establish the identity, and hence the ownership, of valuable data. In various technical applications, critical datasets traverse multiple ownership server domains and at times leave secure ownership firewalled areas. Data has monetary and information value and once valuable datasets leave monitored networks or physical boundaries, they can be subject to replication and resale, at times unauthorized and illegal, with the claim of new ownership attached with the resold data. Without a dataset fingerprint, ownership of the data asset cannot be authoritatively asserted by the original data owner thus leaving the authorized owner with the inability to prove ownership of the stolen dataset.

In various implementations described herein, the invention is directed to a unique fingerprinting algorithm that takes an arbitrarily large and structured dataset and statistically characterizes the data by applying canonical statistical tests to the data. Large structured datasets are often composed of a collection of data subsets (for example, individual columns within a table), each with different characteristics. In large structured datasets, this unique fingerprinting system and method applies different canonical statistical tests to each subset of data and produces a set of statistical fingerprints specific to that data. The overall output, or result, of the fingerprinting method, as applied to a large dataset, is a composite and unique set of subset data metrics that collectively fingerprint the tested data. This composite statistical fingerprint, as applied to a uniquely identifiable dataset, is the equivalent of a human fingerprint that is used to uniquely identify people. Every data subset has its own implicit statistical fingerprint and the overall dataset is statistically described by the subset prints.

The method described herein is architecturally and operationally capable of being split into two functional stages, each with its technical capabilities and measurements. The first stage is a characterization functional stage that is applied to an individual dataset. This stage generates the fingerprints and captures details under the statistical fingerprinting main routine. The second stage is a comparison functional stage that, when given multiple fingerprints, can compare the two fingerprints and report from a statistical perspective whether they are statistically similar or different.

These two functional stages are architecturally designed to exist independently, and in this actual implementation, are implemented as separate modules, and are run independent of each other.

In a typical real deployment, two datasets are made available to the characterization engine that then generates the statistical fingerprint for each. The output of this stage is a set or collection of fingerprints, one collection per dataset. Once fingerprints are available, comparison of fingerprints across multiple fingerprints is done by the comparison module which, when given access to multiple fingerprinted datasets, compares and reports on the statistical overlap between the datasets.

Variable types affect the statistical tests that produce a fingerprint. A good understanding of the data type is necessary to the application of the appropriate statistical method. Bringing data within a subset to a standard form is also necessary for the application of a characterization algorithm.

Data in structured datasets can be:
1. Quantitative
    a. Metric, distances have meaning
        i. Interval (ordered and exact difference between levels)
        ii. Ratio, has meaningful zero
2. Categorical (Factor, Qualitative)
    a. Nominal
        i. Binary/Dichotomous (e.g., gender, yes/no, 0/1)
        ii. Qualitative (e.g., hair color, language spoken)
        iii. Non-ordered Polytomous, also called multiple discrete categorical (e.g., employment status, employed, unemployed, retired etc.)
    b. Ordinal (Rank), distances do not have meaning
        i. Binary/Dichotomous
        ii. Ordered Polytomous (e.g., Likert scale, H/M/L)
3. Mixed, rarely found in structured datasets and so are not discussed in this document Datasets that are subject to statistical processing are cleaned, processed, transformed and made homogeneous and conformant to a standard data type prior to application of the fingerprinting algorithm. Consistent preprocessing, without changing the underlying data or its statistical characteristics, leading to consistent data presentation, is a particularly important requisite prior to characterization and comparison of datasets. Preprocessing, to fix data presentation without affecting the data itself, allows for processing and interpretation consistency. Consistent data allows for automation within the statistical fingerprinting process.

Ensuring compliance with well-known assumptions of parametric statistical metrics allows the application of most statistical tests without corrective adjustments and caveats. In the types of datasets that are relevant to fingerprinting, the sample sizes are large, generally exceeding 10,000 observations. By a complementary measure, no real world samples exist that would be considered statistically small. Given these large samples and the lack of small sets of observations, the data distribution is amenable to the application and interpretation of parametric tests and non-parametric tests, with no statistical corrective actions needed. Parametric tests are believed by the inventors hereof to be the most powerful. While canonical notions of normality may not always apply to the data that falls under fingerprinting purview, the typical large data sets, such as the ones that are dealt with in the data fingerprinting domain, allow for valid application and interpretation of statistical tests even when data is non-parametric.

Structured data, whether it is categorical or quantitative, exhibits statistical properties that are unique to its makeup.

By understanding the data type in a data subset, canonical statistical methods can then be applied to the quantitative or categorical subsets to generate unique subset fingerprints. The collection of subset fingerprints is then the fingerprint of the entire dataset.

Referring now to FIG. 1, the steps involved in the generation of a fingerprint at a very high level may be discussed. The rest of this document describes the details of the steps and sub-steps involved.

Analysis begins at step 000. At step 001 a data subset is selected, which can be the first data subset in the dataset or the next data subset in a multiple subset dataset. Also at this step it is determined whether the data subset is valid for statistical processing. If the data subset is valid for statistical fingerprinting, the data subset is marked for further processing by saving the column name in a list of valid column names that will be further processed. At step 002, the valid data subsets are processed through the statistical fingerprinting routine. At step 003, the statistical fingerprinting system determines whether all data subsets have been processed. If the answer at step 003 is yes, processing proceeds to step 004. If not, processing proceeds to step 005 and on to the next data subset. At step 004 all data subsets have been processed, so the system wraps up processing. At step 205, the system reads the next entry in the saved index, then goes to the next data subset. Results are reported at step 006.

Data fingerprinting is applied to structured datasets that are either static or dynamic in the time dimension. Static in the time dimension implies that the data does not change or changes very little with time, referred to as data at rest. Data fingerprinting can be applied against datasets irrespective of their time of origin. Because data changes constantly, statistical fingerprinting algorithms must expect that attribute content in structured datasets will drift over time. In various implementations, the invention includes time drift-based analysis of datasets. To characterize this data drift, fingerprinting is applied to successive periodic snapshots of the data that has the same heritage to determine and characterize correlation behavior between different snapshots of the dataset and to capture a time-based longitudinal view of change.

Quantitative datasets can be characterized from two perspectives. One is from the standpoint of statistical characterization of the actual data via features like the moments of the data's distribution. The second perspective is from the standpoint of the quantitative metrics that apply to the distribution of the data, when the quantitative data is binned into categorical levels and the categorical levels are then characterized. The Chi-Square statistical test family includes the capability to handle both perspectives.

In this unique data fingerprinting system and method implementation as applied to quantitative datasets, statistical metrics of central tendency and variability such as Mean, Median, Mode, Min, Max, Standard Deviation and Variance (5M-SD-V) are also used along with the invented methods of application and interpretation, and these metrics together apply to quantitative variables. With structured data, subset metrics like the column fill-rate also is an important measure. For inter-dataset comparison of quantitative data, the Pearson's R correlation coefficient has been found by the inventors hereof to be a good measure of simple linear relationship between quantitative datasets (using the equivalent of standard Z-scores).

Like quantitative datasets, categorical datasets can be characterized from two perspectives. One is from the standpoint of statistical characterization of the actual data. The second perspective is from the standpoint of the quantitative metrics that apply to the distribution of the categorical data. The Chi-Square statistical test family includes the capability to handle both perspectives.

Categorical datasets are comparable using a measure of how the various factors in the data are distributed. The data is ordered and then the frequency distribution of the ordered data is measured. In the comparison of two datasets, and in order to determine whether observed sample frequencies differ significantly from theoretically expected frequencies, a Chi-Square Goodness of Fit (GoF) test is appropriate. The goodness-of-fit test is a way of determining whether or not the observed distribution of a set of categorical data, with two or more categories, matches the (expected) distribution in a reference population.

Alternative measures in the Chi Square test family exist for comparing granular categorical data. The Chi Square "Test of Independence" (TOI) is a way of determining whether categorical variables are associated with one another in the same sample. For example, one may consider education level and home-ownership and suspect that these categorical data are related. A mechanism built upon a cross-comparison-table or contingency table is used for granular analysis. The TOI test is a Chi Square test on a two-way contingency table where the expected values are a function of the marginal totals, represented as a table with row totals and column totals. This cross-comparison-table or contingency table is a multi-dimensional table that records the actual number of each observed factor within a category across the two samples. The TOI test results augment the test results of the GOF test when the two tests are used sequentially. While a GOF test looks at the entire distribution and may miss the statistical significance of individual variables, the contingency table highlights statistical variations at a variable level. Intra data characterization, by implication, involves just one data homogeneous sample, the one that is being statistically characterized. In such one-sample situations, specific one-sample Chi Square tests apply.

The main statistical fingerprinting engine performs the following functions. The first step performed by the engine takes three input arguments. The first input argument is a generic dataset name list. The entry in this list contains one of the following combinations where each is a dataset name representing a dataset that is stored as a table in a SQL, Hive or Parquet database. We may call them Control and Counterpart, where each can represent a pair of: "Data_Owner" and "Wildfile"; "Data_Owner", "Data_Owner"; or "Wildfile", "Wildfile". The second argument is a Tablename list pair that contains a table name that holds each of the two incoming datasets. For example, where a Data_Owner-Wildfile combination is being fingerprinted the pair could be: [Data_Owner_data_06_2015, Wildfile_data_Lightning_09_2017]. This represents a data owner dataset dated June 2015, and a suspect file that was uncovered on September 2017. The third input argument is a list of data storage locations and the credentials (address, username, password) that are needed to access the corresponding data storage servers. The location of the Control and Counterpart data is captured. Note that the data need not be in independent locations; it can be co-located. The data fingerprinting routine supports both forms of deployment.

At the second step, in preparation to hold fingerprinting results, the engine creates two data directories. One directory exists to hold the fingerprints of the data subsets within Control, and the other exists to hold the fingerprints of the data subsets within Counterpart.

At the third step, the engine connects to the database server that holds the current dataset being processed, one of Control or Counterpart, using the provided network address and authentication information.

At the fourth step, the statistical fingerprinting engine connects to the database that holds the current dataset being processed, one of the Control and Counterpart datasets. The statistical fingerprinting engine then starts a timer for measuring the fingerprinting time and then calls the statistical fingerprinting routine and passes in the name of the dataset being fingerprinted.

The statistical fingerprinting routine executes once for each of the dataset names sent to it by the statistical fingerprinting engine. Given a table name, address of the data storage, and the access credentials, the statistical fingerprinting routine connects to the data storage server. The first two queries are for the Number of Columns (NumCol) and the Number of Rows (NumRow) in the database. A typical output would look like this:

Number of columns in the BBDirect_parq table is 90
Number of rows in the BBDirect_parq table is: 5160

In the above output text, the Number of Columns is 90 and the Number of Rows is 5,160. The statistical fingerprinting routine then prepares to process NumCol number of columns for fingerprinting, each with NumRow number of rows. Using NumCol as a loop index, the routine then collects the names of all NumCol columns in the dataset and stores the names in a ColumnNames table. A typical output would look like this:

| varchar | prefixttl |
| varchar | individualname |
| varchar | firstname |
| varchar | middlename |
| varchar | lastname |
| varchar | address |
| varchar | address2line |
| varchar | city |
| varchar | state |
| varchar | zip |
| varchar | zip4 |

The ColumnName table and the connection parameters are then passed on to a column processing engine. Each column is a data subset of the original dataset in this example.

The column processing routine manages all qualified columns in a loop with identical processing for each. For each column being processed, the routine first reads the data in the column using an SQL query and loads it into local memory. The data is categorized into valid values and forced to hold an "NA" value for any row that is not populated or has default data. The data is then sorted and counted and put into a list that holds the tag and the count for each. A typical sorted and counted output looks like this:

{'90011': 16455,
'90037': 94,
'90001': 79,
'90044': 77,
'90003': 72,
'90002': 59,
'90059': 41,
'90280': 39, . . .

Each entry in the list has the form a:b. The first item in each entry (a) is a tag representing a name or a value and the second (b) is the number of times that the tag occurred in that data subset. Sorting can happen in one of two ways. The typical sort is performed on the tag so that the tags are alphanumerically listed. However, in the example above the sort was performed using the count value and so the data are listed in order of decreasing count. Either sort can be invoked and used. The sorted and counted data in the column is then handed off to a data profiler routine.

The function of the data profiler is to statistically profile the data. The routine relies upon Python library routines to perform the following calculations: Mean, Median, Mode, Min, and Max. In addition, One Sample Chi Square is a measure using the observed frequency as the theoretically expected frequency. The data tags occasionally follow the pattern {"0", "1", "2", "3", "4", "5", "6", "7", "8", "9", "A", "B" . . . } where the numeric tags transition into alphabetic tags; in such instances, the tags are recoded to be: {"0", "1", "2", "3", "4", "5", "6", "7", "8", "9", "10", "11", "12", "13", "14", "15", . . . }. The retagging of alphabetic tags to numeric causes an issue with sorting. The numeric sort order becomes: {"0", "1", "10" "11" "12", "13" "14" "15" "2", "3", "4", "5" "6", "7" "8", "9" . . . }. This changes the order of the data. A functional programming based implementation in the routine then resorts the data so that the order is forced to be accurate: {"0", "1", "2", "3", "4", "5", "6", "7", "8", "9", "10", "11", "12, "13", "14", "15", . . . }. All the statistical test results and the remapped tags are then converted into JSON format and then written to a fingerprint file. A typical fingerprint file then looks like this:

```
{
"colName": "sportstv",
"TotalRows": 5160,
"chiSquaredGOF": 0.0,
"chiSquaredProb": 1.0,
"freq_mean": 2580,
"freq_median": 2580.0,
"freq_mode": " default – 0",
"freq_max": 4760,
"freq_min": 400,
"fill_rate": 1.0,
"sourceFileName": "BBDirect_parq",
"timestamp": "2017-09-14 11:09:20.252550",
"numFactors": 2,
"ActualDistribution": {
    "\"\"": 0.9224806201550387,
    "\"1\"": 0.07751937984496124
},
"UpdatedchiSquaredGOF": 0.0,
"UpdatedchiSquaredProb": 1.0
}
```

After iterating through all the implicit loops in the above steps, the statistical fingerprinting routine exits. The result, in this described instance, is a pair of results directories, each populated with multiple JSON files each containing a fingerprint for a single data subset. Each of the files has a ".json" postfix. The files look like this:

In the Control directory:

BBDirect_parq_address2line_data.json
BBDirect_parq_zipline_data.json
BBDirect_parq_lastname_data.json
.
.

-continued

In the Counterpart directory:

.
.
BBDirect_address2line_data.json
BBDirect_ageofindividual_data.json
BBDirect_city_data.json
.
.

Figure 2:
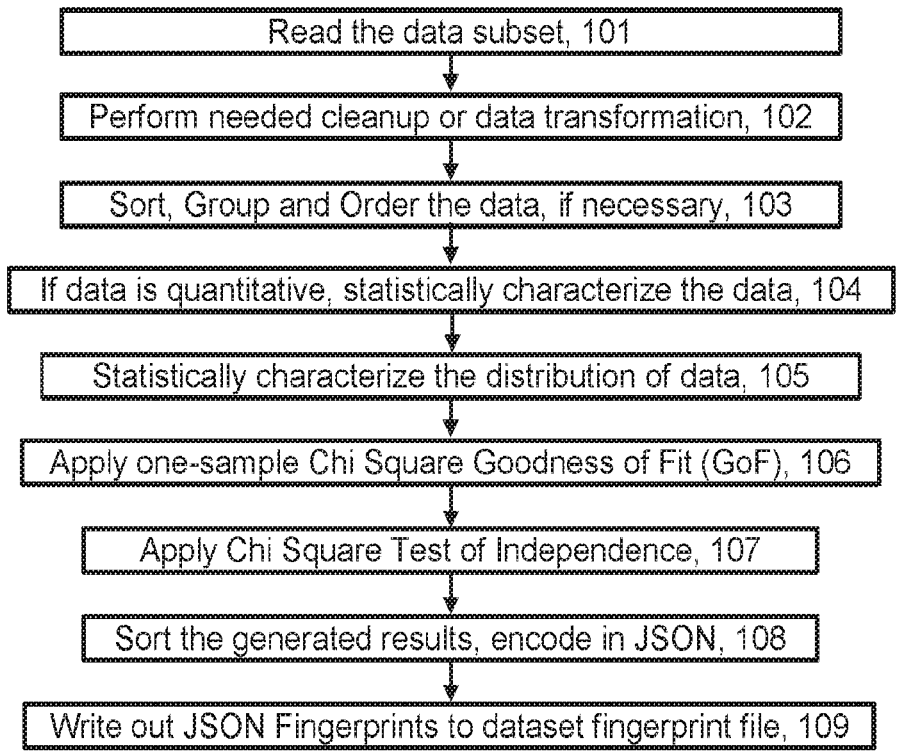
FIG. 2 is a flow chart depicting the processing of a single data set according to an implementation of the present invention.

Referring now to FIG. 2, these steps may be described more succinctly. At step 101, the data subset is read. At step 102, the routine retains only the rows that have valid data. At step 103, rows of similar items are sorted, ordered, and grouped, as identified by factors. If the data is quantitative, the data is binned at step 104 so that categorical groupings of the data are available. At step 105, the data is statistically characterized by computing the Mean, Median, Mode, Min, and Max. This test composite is referred to as the 5M tests. Also at this step, the fill rate is computed. The source data file name and the current timestamp is noted and the distribution of data in this data subset is captured; if the data subset is qualitative, this step involves computing a percentage of each factor out of the overall total. The one-sample Goodness of Fit test is applied at step 106, assuming that the expected data distribution is a uniform one. At step 107, the Chi Square test of Independence is run to capture a contingency table and provide observed and expected values for each factor. At step 108, the results are sorted and stored in JSON format. XML format is also an alternative possibility. At step 109, the results are written out to a file that becomes part of the data owner record.

A statistical fingerprinting based dataset or subset comparison requires a pair of datasets or data subsets. In a typical use case, one dataset has data owner heritage and the other dataset (called a "Wildfile") is the suspect file that is to be tested against the data owner set. While this data owner use case refers to specific data parentage for purposes of example, a general application of statistical fingerprinting does not impose any restrictions on datasets that can be compared.

In this data owner use case, the origin and structural makeup of the Wildfile is likely unknown, and because it could have been derived from a superset or subset of the data owner's data, baselining of the two datasets to a common data and time foundation is required before statistical comparison can be applied. When two datasets have unknown heritage or have unknown baselines, statistical comparison must be supported with additional reasoning and qualifying tests in order for the test results to be deemed valid. For statistical results to be confidently valid, datasets must be pre-processed to a common foundation.

Preprocessing is explained in more detail in International Patent App. No. PCT/US2017/01707, entitled "Change Fingerprinting for Database Tables, Text Files, and Data Feeds," the disclosure of which is incorporated by reference as if fully set forth herein. First, a reduced version of the Wildfile data that only retains records of data that are known to the data owner is generated. The data owner's known records are identified using a data linking tool such as AbiliTec by Acxiom Corporation, which applies tags named Cons-link (consumer link), Household-link (HH) and Address-link (AL) to people data for identity-linking (recognition) purposes. The Cons-link tag is used as an exemplar in this description, but HH and AL may be implemented in other versions. By preprocessing the Wildfile and only retaining the rows that match a known consumer link, the Wildfile is brought to a basis that can be matched by the data owner file (Data_Owner). The tags other than Cons-link from Abilitec could similarly apply in alternative implementations. Ancillary processes, such as row de-duping, help to narrow the data down to a core set of comparable records.

Once the Wildfile has been brought to a common basis with the data owner file (Data_Owner) through the recognition procedure, the change fingerprinting process is used to establish a data range for when the file was generated for the Wildfile dataset. More details concerning the overall fingerprinting approach are disclosed in International Patent App. No. PCT/US2017/023104, entitled "Data Watermarking and Fingerprinting System and Method," the disclosure of which is incorporated herein in its entirety. Understanding the data range allows for a common baseline of comparison. Once a distribution date range has been identified, a set of Data_Owner data with the same Cons-Links and data recency date range is generated from Data_Owner's internal data archive. This resulting Data_Owner dataset is from the same time period and contains identically corresponding records as the Wildfile dataset.

Inter-data-subset characterization, by implication, involves more than one data sample but is typically restricted to two data samples, one that is to be used as a baseline and the other that is to be statistically compared with the baseline. In such two-sample situations, specific two-sample tests apply with one-sample results from the baseline sample being used as a reference to compute the two-sample characteristics. The process as it applies to quantitative data and to categorical data is described below.

For inter-dataset comparison of quantitative data, techniques such as Pearson's correlation are applied. Once each data subset has been characterized by techniques described above, quantitative data subsets are compared using the Pearson's Correlation test. The Pearson correlation coefficient is a bivariate statistic ranging between −1 to 1 that quantifies the strength of a linear association between two variables. A value of 0 indicates that there is no association between two variables. A value greater than 0 indicates a positive association; that is, as the value of one variable increases, so does the value of the other variable. A value less than 0 indicates a negative association; that is, as the value of one variable increases, the value of the other variable decreases. A value close to 1 or −1 is deemed to indicate a very significant association between variables.

For inter-dataset comparison of categorical data, techniques linked to the Chi Square family of tests and quantitative comparison of distributions are appropriate. This is graphically described in FIG. 3. At step 200, the two data subsets are chosen. Data subset A is chosen at step 202, and data subset B is chosen at step 204. The system then determines if the two datasets have the same number of factors at step 204. If not, return to step 200, or if so, move forward to step 205. At step 205, the two-sample Chi Square GoF metric is applied. Then at step 206, the Chi Square TOI is applied across the two samples. A metric-by-metric comparison of the two data subsets is run at step 207. Comparisons may be performed via 5M, Fill Rate, Factor Names, Factor values, Metadata overlap, and/or Column name overlap. Finally, the test results are reported at step 208.

The data fingerprint comparison engine is responsible for comparing fingerprints of two datasets and reporting the result. The process of dataset comparison decomposes into comparison of multiple data subsets (variables) that make up the dataset. The fingerprints of the data subsets are available from the prior step as a set of files for each dataset. The main statistical fingerprinting data comparison engine performs an all-against-all comparison of files in the Control set and the files in the Counterpart set. The particular steps are described below.

The main statistical fingerprinting comparison engine takes two arguments: a directory pointer to fingerprints from a Control dataset, and a directory pointer to fingerprints from a Counterpart dataset. Typically, one is a baseline, possibly Data_Owner derived, the other is the one that is to be compared against the baseline. The engine traverses each of the two directories and extracts all files that have a ".json" postfix. Each list of .json files from each of the two directories is maintained separately. Given the two lists of files, the engine generates a dot product pairing of all files in the Control directory with all files in the Counterpart directory. The pairings look like this:

```
.
.
Control/BBDirect_parq_address2line_data.json,
Counterpart/BBDirect_address2line_data.json
Control/BBDirect_parq_address2line_data.json,
Counterpart/BBDirect_ageofindividual_data.json
.
.
```

Figure 3:
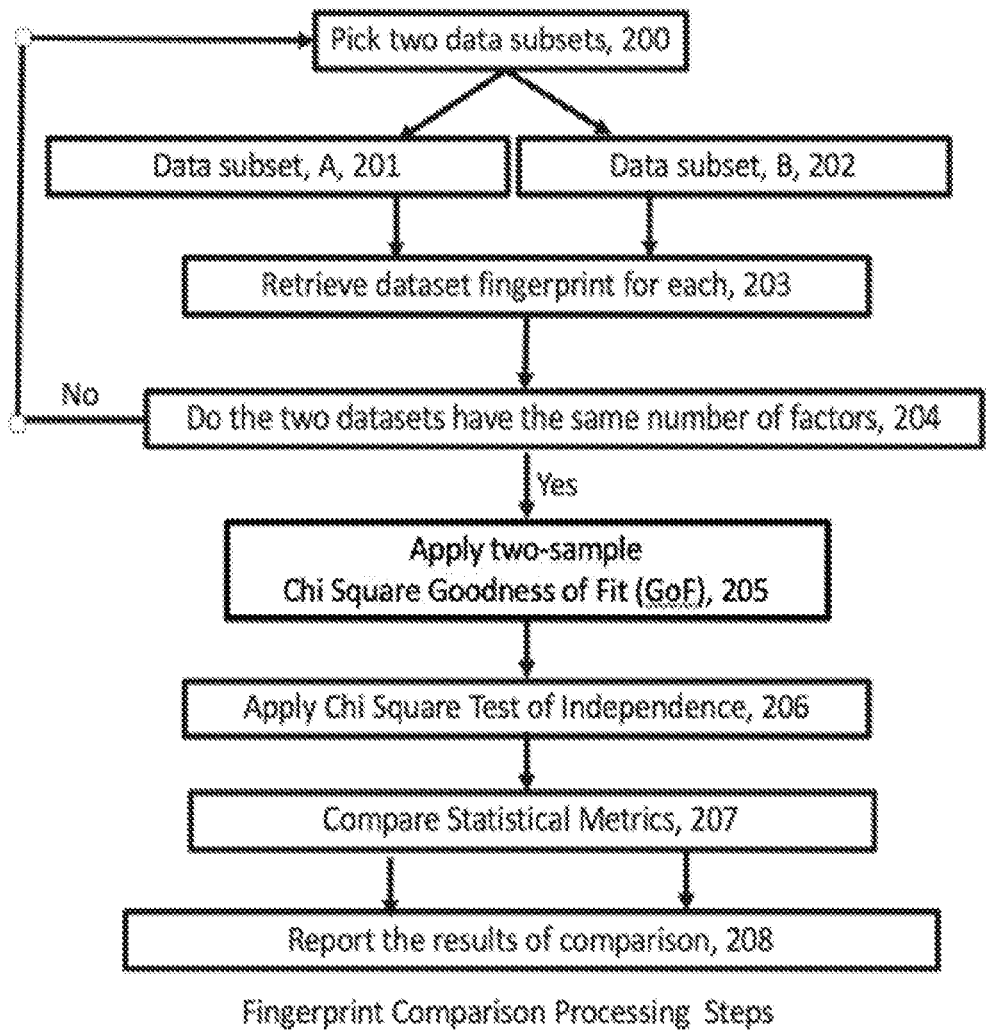
FIG. 3 is a flow chart depicting the process of comparing fingerprints according to an implementation of the present invention.

The engine then processes each pair of files from the list, starting with step 200 in FIG. 3 above and run through Steps 201 and 202. Each file is opened and the data is read. Call the data as ControlData and CounterpartData, at Step 203. Step 204 asks if the two datasets have the same number of factor levels. If they do, they qualify for comparison. If they do not, they do not qualify for comparison. In this latter case, the system picks two other data subsets. If there is a match in the number of tokens that were detected in each of the data subsets, the file pair is added to a list of "comparable" files. The engine then iteratively processes the list of comparable files.

A feature metric comparison between the ControlData and the CounterpartData is considered a match if the numeric metric between the two lies within a 10% band of each other. A band is used that is 5% lower to 5% higher so that both higher and lower boundaries are matched. The 10% metric is a guideline. Higher or lower percentage metrics can be used in order to set higher or lower tolerances in alternative implementations.

To compare feature names, an overlap measure is determined and logged between the original column names. An exact overlap of names is flagged as being a hit. Partial matches are logged but not weighted for comparison. Partial match comparisons can be strengthened by using a quantitative string matching algorithms common in NLP.

To compare column names, a column name matched between ControlData and CounterpartData is logged. A column name match is an indicator of a possible match of data.

When two data subsets have the same number of factors, the one-sample Chi-Square distribution from the Control sample may be used as the expected distribution within the Counterpart sample. (The Counterpart continues to retain its single sample GOF results). The engine now runs a two-sample Chi Square test between the feature data in Control Data and CounterpartData. The ControlData distribution is used as the expected distribution of the CounterpartData data and a Chi Square metric and probability are computed and logged. The Chi Square metric is a measure of the deviation between the observed CounterpartData and the expected CounterpartData. This number will vary in magnitude based upon the frequencies of the underlying data. A value of zero is considered highly significant because the expected numbers exactly match the actual, indicating a complete data overlap. A value less than 100 is notable. Larger numbers are noted because they indicate a deviation between expected and observed. The Chi Square probability metric is a quick indicator of data overlap. If the value is 1, the data matches exactly. If the associated probability is 0, the two datasets do not match. Values in between 0 and 1 are indicators of degree of possible match, with 0.05 or greater being noted as being statistically significant.

The Chi Square Test of Independence is run between the ControlData and CounterpartData, with the probability metrics from this test logged with the same emphasis on a probability close to 1 as being statistically significant.

The results of these steps are logged in tabular and CSV form. The results that show a high Chi Square probability are sorted to be displayed at the top of the table. Filtered results that only show the top matches are also available. A match between the datasets is significant when one or more data subsets show a Chi Square probability of match.

The metadata are also compared between two fingerprint files. The column names are read from the JSON file when the fingerprints are read. If the ControlData represents a Data_Owner file, a data dictionary is consulted and the detailed string descriptor for the Data_Owner column is appended to the Control column name. The Counterpart column name is not changed. The Control and the Counterpart column names are then cleaned to be free of special characters (e.g., ./$#@%"&*(")[ ]) and subsequently tokenized into individual words. For all tokens in the CounterpartData column header, a synonyms dictionary is consulted and corresponding synonyms are added to the ControlData column tokens. This enhancement provides a significantly higher possibility of match between the two column header tokens. The two token lists will be referred to herein as ControlTokens and CounterpartTokens. Commonly used words are excluded from both the ControlTokens and the Counterpart Tokens. This ensures that a match between columns does not happen on the most common tokens and thus avoids mismatches. A token comparison is then conducted between the ControlTokens and the CounterpartTokens. If the token comparison yields a Null or empty result, the two columns are deemed to not be comparable and the engine moves on to the next file pair.

Figure 4:
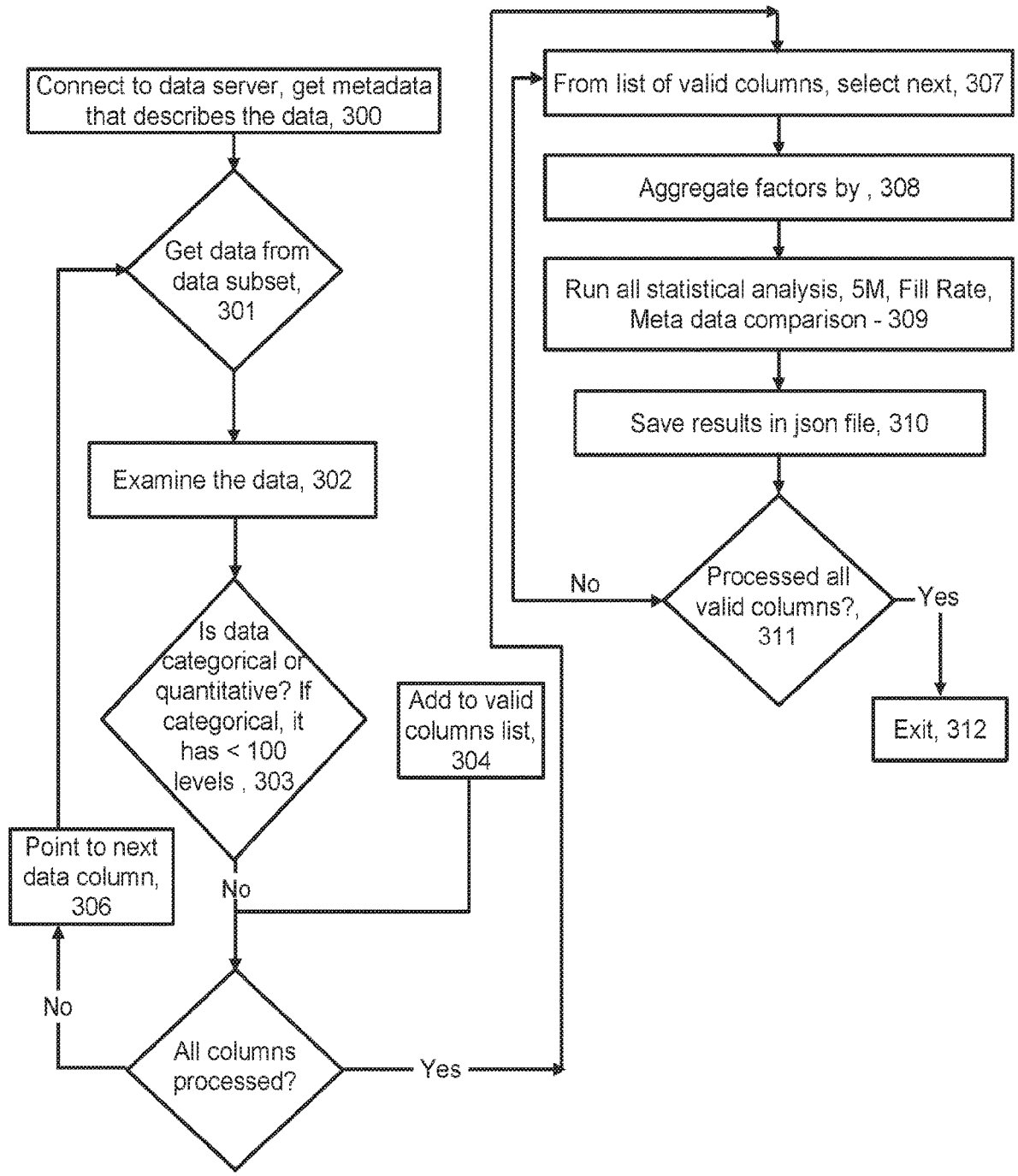
FIG. 4 is a flow chart depicting the data fingerprinting characterizer functional flow according to an implementation of the invention.
Figure 7:
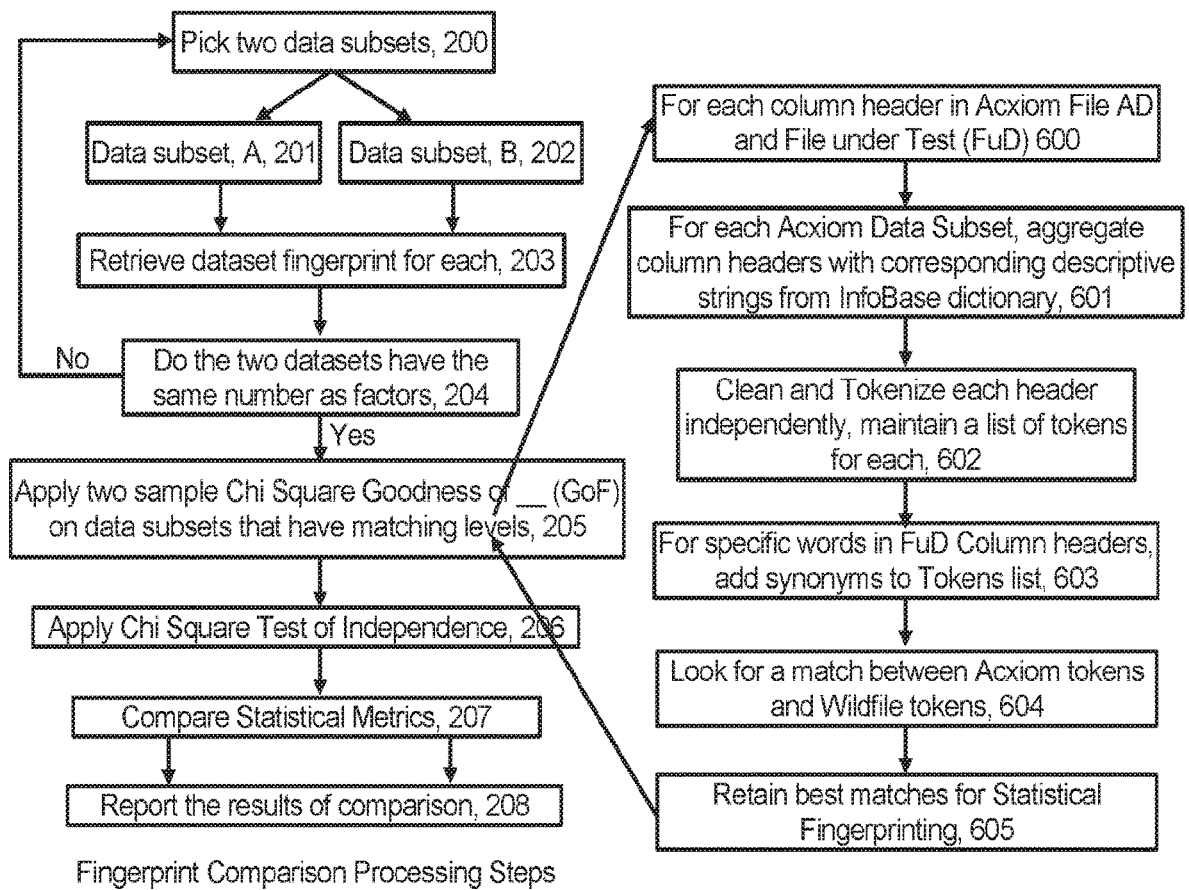
FIG. 7 is a flow chart depicting metadata comparison for converged matching of data subsets according to an implementation of the invention.

An overall functional flow of the fingerprinting module is captured in the flowchart of FIG. 4. This process flow supports a modular implementation for fingerprinting of individual data subsets. Two passes are made through the described process when two fingerprints need to be generated for comparison. Beginning at step 300, the statistical fingerprinting engine connects to the data storage device where the data resides and retrieves metadata of the data. The metadata is part of the data matching algorithm. At step 301, the statistical fingerprinting engine reads each data subset from the data storage device, and at step 302 examines the data for its characteristics. At step 303, the statistical fingerprinting engine looks for specific defined criteria such as data type and number of factor levels. If the data in the examined subset qualifies for fingerprinting, then at step 304 it is added to a master list of subsets that need to be compared. If all known data subsets have been processed at step 305, a master list of qualified subsets is available and the engine goes to the next step. If not all data subsets have been processed, the next data subset is examined at step 306 until all data subsets have been processed. Once all data subsets have been examined and a full list of qualified columns is in place, all the data is ready for analysis. Using the master list generated above, at step 307 the statistical fingerprinting engine cycles through all valid subsets (in this case, columns) one at a time. In some instances, categorical factors are aggregated or decomposed at step 308, and quantitative variables are binned and aggregated as categories. The core statistical fingerprinting analysis is executed and fingerprints are generated at step 309. The generated fingerprint results are stored at step 310. If all data subsets have been processed at query step 311, the process exits at step 312. If not, the engine processes the next data subset by returning to step 307. Fingerprints are represented in portable data formats such as JSON or XML. JSON is compact compared to XML; therefore, in an effort to keep fingerprints compact and portable, the choice of JSON may be advised for certain applications. Nevertheless, XML can also be used. The example of FIG. 5 (discussed below) is in JSON format.

Referring now to the example JSON format data of FIG. 5, data categories within the attribute column and their individual normalized frequencies headline each file. Section 401 shows the total number of data elements in the data subset and the results of the one-sample Chi Square test. Section 402 shows the base statistical metrics of the data. It includes the 5M data and additionally the fill rate. Section 403 displays the source of the data and the timestamp when the statistical fingerprinting test was run. Section 404 shows all the factor levels that were recognized in the data subset. Factors that go beyond "9" are encoded as "10" and "11" and so on even though the original data may have had "A" instead of "10", "B" instead of "12," and so on. This transformation is done so that categorical data can be compared using quantitative tags. Also, data that is missing or does not fall into the well-known categories is classified as "NA". Section 405 is a reserved space that is to be used once the two-sample data storage issues are resolved. Because a two-sample comparison data requires an update for every compared combination, this data is specific to a certain combination. The statistical fingerprinting engine runs through hundreds of combinations prior to finding ones that make sense. Rather than saving this data as many times as there are tested combinations, this field is not currently populated.

Fingerprints are measured by the size of the file that holds the fingerprint. Fingerprints representing a composite dataset are a collection of modular fingerprints of data subsets. If a structured dataset has 1500 attribute columns, and 1000 of them are determined to be amenable to fingerprinting, 1000 JSON fingerprint files of the data subsets represent the fingerprint of the dataset.

Because fingerprints can reference a data subset, a collection of fingerprint files represents a composite fingerprint of a dataset. Each file is a few hundred bytes in size, up to about 4 k. A large data set could have 1000 subsets and a full fingerprint collection could be about 4M in size.

Figure 6:
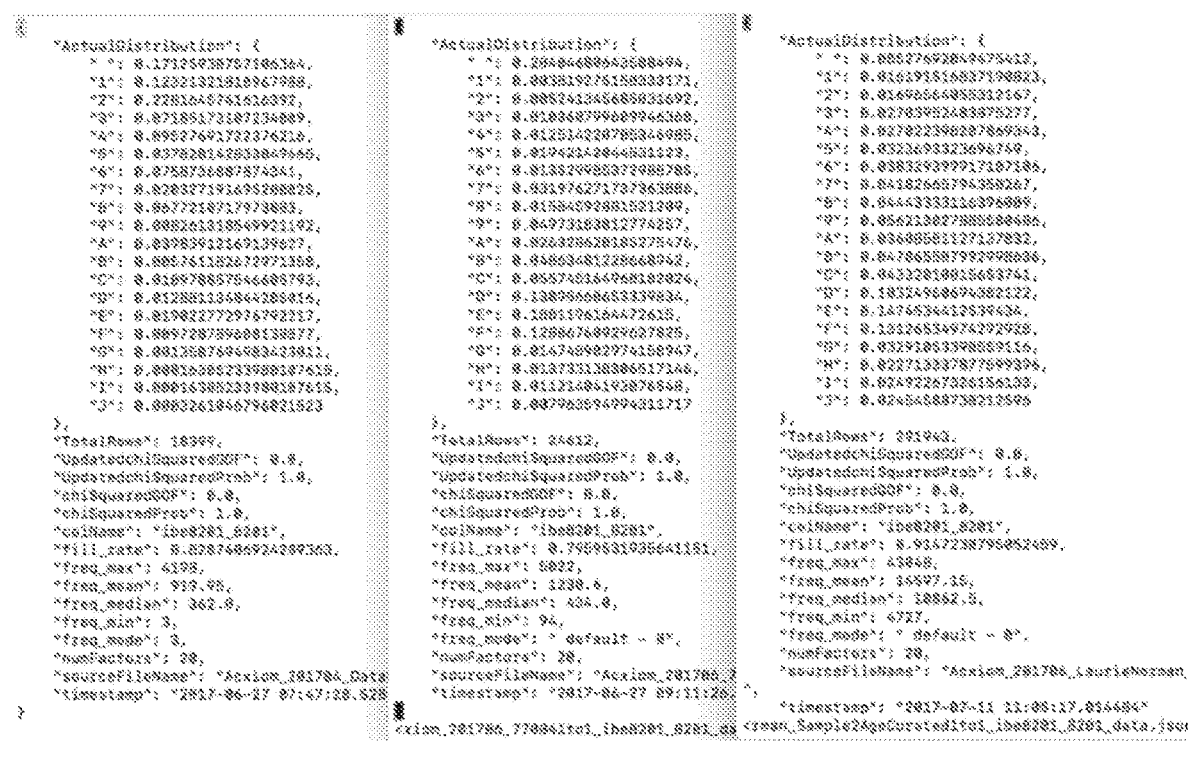

A single fingerprint does not carry a time dimension other than a timestamp as to when that fingerprint was generated. However, a set of fingerprints, with the same pedigree, measured at different instances in time can be used to measure the statistical drift of data over time. Starting with the fingerprinting of a timestamped snapshot of data, a series of regular fingerprints taken over multiple time-stamped instances can provide a view of the incremental statistical changes in the data set. Through this approach of gathering timestamped fingerprints, data subsets within the composite dataset which change over any measured time interval can be identified. Time-staggered measurements indicate trends with time. This part of this implementation of the invention is illustrated in FIG. 6. A specific method for treating change values over time is disclosed in U.S. Pat. No. 9,535,933, entitled "System and Method for Representing Change Values," and U.S. Pat. No. 9,529,827, entitled "Change Value Database System and Method," each of which are incorporated by reference as if fully set forth herein.

Looking more specifically at comparison over time intervals, variants of example data with the same foundation of origin may be exemplified as the data changes encodings, bin levels, and other attributes. By measuring the statistical fingerprints at each snapshot, the data is characterized over time. The time characterization of data is a time domain fingerprint of the data. Drift in statistical characteristics can be quantified, reported and visually charted if a statistical measure is repeated across the time intervals. If no drift pattern in a series of repeated measurements is evident, the data can be characterized as having been at rest over the measurement term or time interval.

Turning now to statistical fingerprint comparison methods, one approach is the Null hypothesis. The Null hypothesis for the comparison of two data fingerprints is that the two fingerprints come from the same population. The fingerprint comparison test then establishes whether or not the Null hypothesis can be rejected or whether the tests fail to reject the Null hypothesis.

Another approach for statistical fingerprint comparison is to allow the fingerprint implementation to treat all datasets as opaque and find all data subsets that statistically match. The goal is to reject all data subset pairs that do not statistically match. However, opaque application of the routine compares all qualified subsets against other qualified matching subsets, with no understanding of which data subsets actually match in a category. In a dataset that has 1000 subsets, this can cause almost half a million pairwise comparisons. Some of these combinations are likely to show a statistical match even though they do not carry data categories that match. An advantage of this approach, however, is that an opaque routine keeps biases out of the picture.

Figure 8:
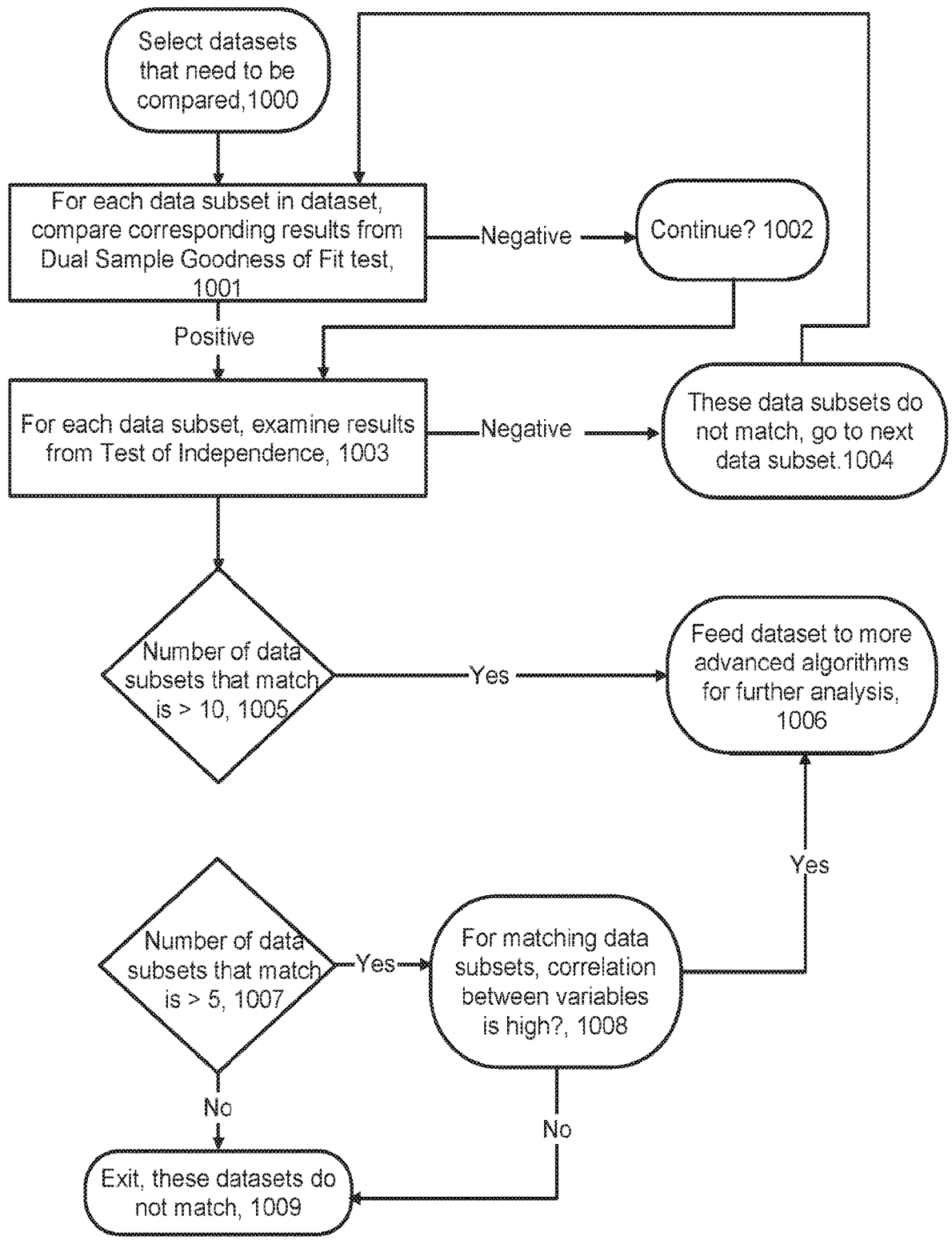
FIG. 8 is a decision tree for statistical comparison of fingerprints according to an implementation of the invention.

In general, it makes sense to converge on comparisons of fingerprints of similar or identical categories of data. An example is "Income" against "Income" and "House Ownership" against "House Ownership." While converging to comparisons of variables that encode identical datasets is most ideal, automated convergence to this goal is challenging. An innovative new comparison and match algorithm has been designed and implemented to support focusing on comparable data subsets. Given two datasets that need to be compared, all fingerprint combinations (that is, JSON files for matching categories) with matching factor levels are found and paired. The pairings may or may not contain comparable data and the Statistical Fingerprinting algorithm later makes the filtered choice to only retain the appropriate combinations. The paired JSON fingerprint combinations are filtered using prominent words or tokens derived from the column metadata, to only retain the pairings with matching tokens, in order to focus the number of matched combinations. The stepwise approach to using column metadata to converge on data subsets with similar categories of data is shown in FIG. 8. Building up sub-steps off of step 205 from earlier FIG. 3, at step 600 the process begins for each column header in the data owner's original data file (Data_Owner) and Wildfile under test. At step 601, for each data subset in the owner's file the aggregate column headers with corresponding descriptive strings are included from the data file's metadata dictionary. Each header is cleaned and tokenized independently, and a list of tokens is maintained for each, at step 602. Then, for specific words in the file column headers, synonyms are added to the tokens list at step 603. At step 604, the process of looking for a match is run, comparing the tokens for the data owner's data file (Data_Owner) and Wildfile tokens. The final sub-step is step 605, where best matches are retained for statistical fingerprinting further analysis. Note that while the metadata dictionary for the data file owner's data file is used in this example, other sources of metadata and tokens could be used in other implementations.

The decision tree of FIG. 8 is used to decide if a potential data overlap between two files has been discovered. At step 100 0, two datasets that need to be compared are selected. For each data subset in the dataset, at step 1001 the two-sample Goodness of Fit metric is examined. If the result is significant or positive, the process continues by comparing Test of Independence metrics at step 1003, at a high level of confidence. If GOF results are not significant, then the process compares the Test of Independence results, but this is just so that any last possibility of a match is eliminated. Step 1002 is a manual decision point on whether to continue processing or to exit, based upon intuition about the data.

If the result of Step 1003 is negative, then the process goes to the next data subset combination at step 1004. After having cycled through all data subsets at step 1005, if the total number of matched data subsets exceeds 10, there is a data match. (Note that numbers used herein pertain to one implementation, but the invention is not so limited, and the threshold could thus be any other number desired.) If there is a data match at Step 1005, then at step 1006 the engine feeds the data to more advanced routines (such as, for example, Principal Component Analysis). At step 1007, if the number of data subsets that match is greater than 5 but less than 10, the matching data subsets are examined to see whether correlation between any is high enough to warrant further analysis. If the answer at Step 1007 is yes, then at step 1008 the system passes along to more advanced routines. Step 1009 is the exit path if these datasets do not match.

Figure 9:
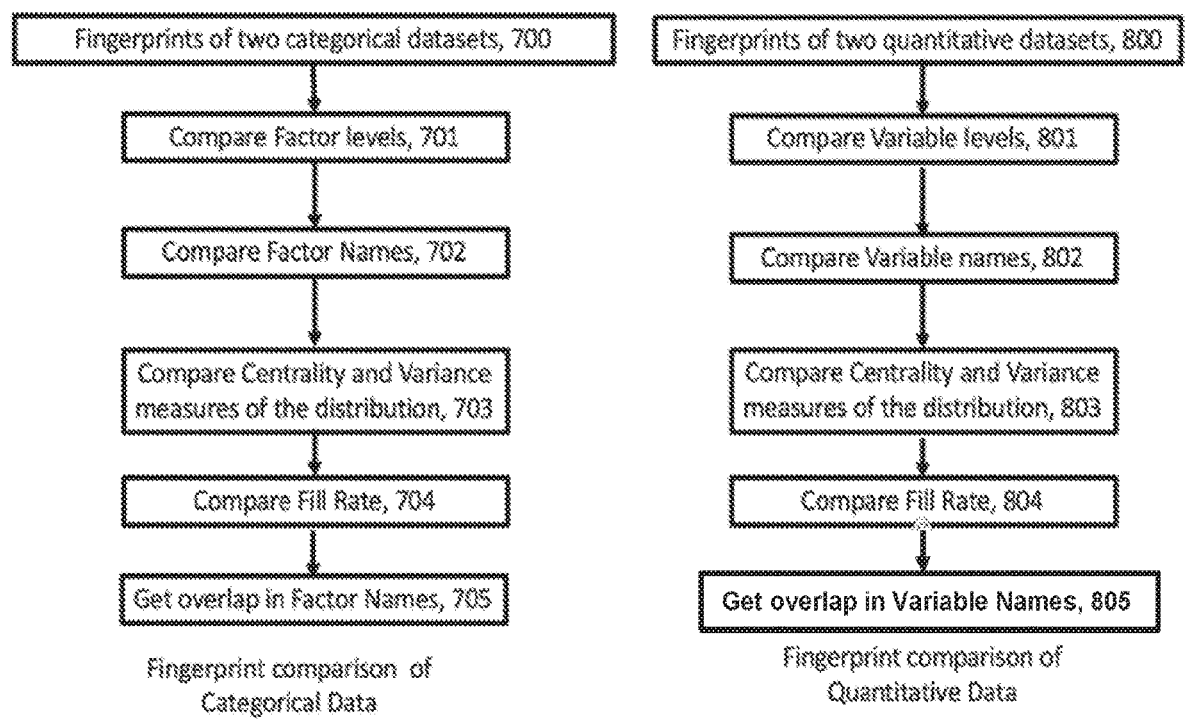
FIG. 9 is a comparison of two flow charts depicting the process for fingerprinting of two categorical datasets and two quantitative datasets according to an implementation of the invention.

Referring now to FIG. 9, the differences in processing of fingerprint comparisons for categorical and quantitative datasets may be described. At step 700, fingerprints of two categorical data sets are received. The factor levels are compared at step 701 and the factor names are compared at step 702. The centrality and variance measures of the distribution are then compared at step 703, and the fill rate is compared at step 704. Finally at step 705, the overlap in factor names is received. Processing for quantitative datasets in steps 800 to 805 is generally similar, except that the comparisons at steps 801 and 802 are of variable levels and names, rather than factor levels and names, owing to the difference in parameters for the two different types of data. Likewise, step 805 is where the overlap in variable names, rather than factor names, is received.

Figure 10:
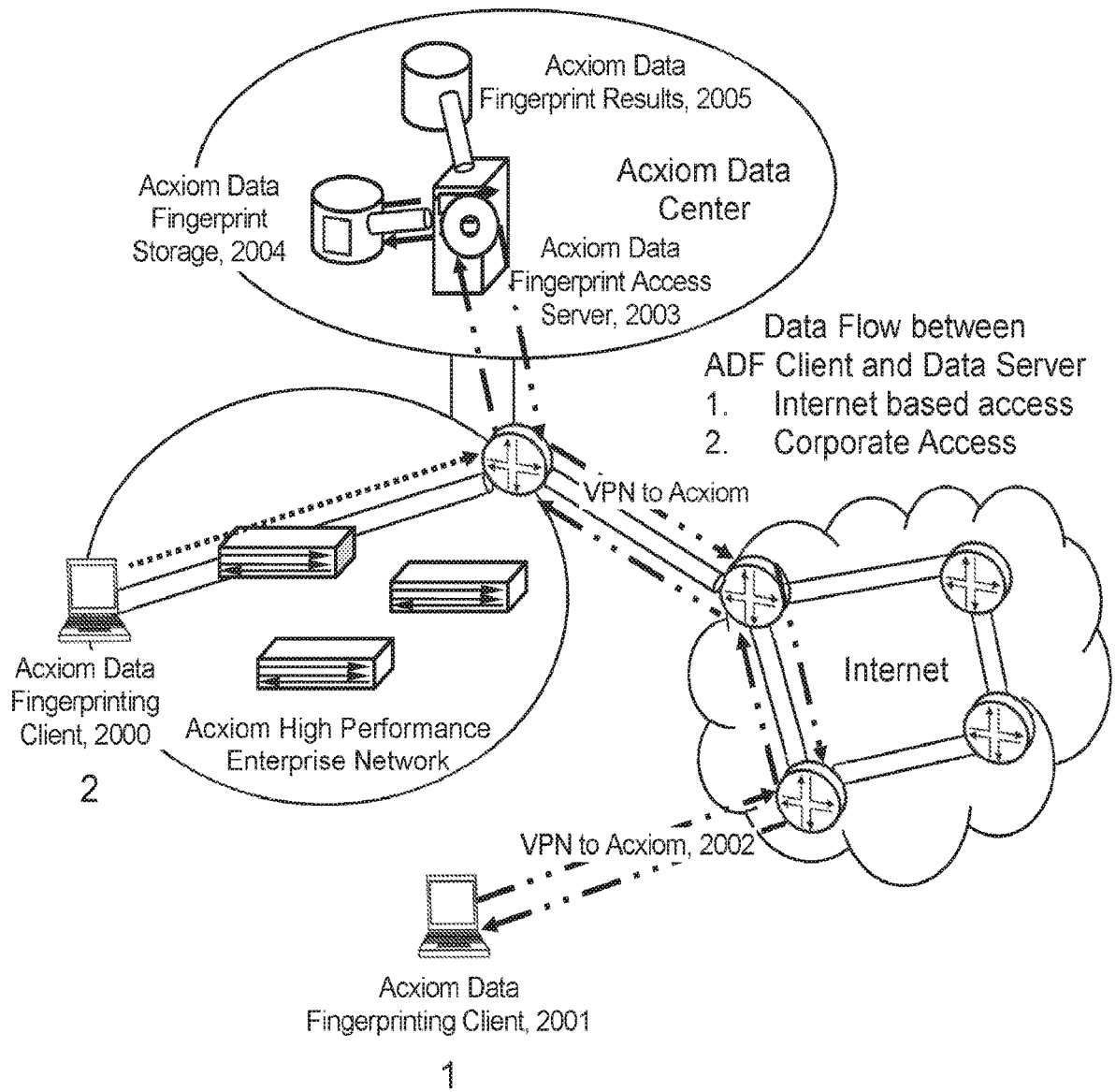
FIG. 10 is a schematic illustrating a computer network implementing the statistical fingerprinting process according to an implementation of the invention.

Statistical Fingerprinting relies upon fully integrated, high-performance servers, network, and storage to make its functionality viable. The implementation of the specific system used for this invention is illustrated in FIG. 10. For fingerprint creation, clients drop their files into a location via SFTP or Network Storage to begin the ingestion process to create the fingerprint(s) from the file at step 000. The process to clean, standardize, group, sort and create the fingerprint(s) can be performed in a single cluster technology (ex. Hadoop) at step 001. As fingerprint(s) become available, requests to store the fingerprint(s) occur at step 002 and through the fingerprint storage API at step 003, while storage or retrieval requests for fingerprint(s) in the primary storage location occur at step 004 and step 005. Once the fingerprint(s) are placed in primary storage, the system requests and stores a copy of the new entry in the API's cache in step 006 and step 007 for faster lookups.

For fingerprint detection, clients drop their files into a location via SFTP or network storage to begin the ingestion process to detect the fingerprint(s) from the file at step 008*a*. Alternately, files can be imported into fingerprint detection directly from the fingerprint creation process, as shown in step 008*b*. The process to handle fingerprinting comparison can be done in a single cluster technology (ex. Hadoop). The system detects the specific file characteristics in step 009 and requests the specific fingerprint(s) in step 010. The fingerprint storage API (003) can be used to lookup the specific fingerprints in the cache in step 006 and step 007. If the requested fingerprints aren't found in the cache (a cache "miss"), then the API is used to request and retrieve the fingerprint(s) data from storage through steps 004 and 005. If the file has no fingerprint(s) then the system halts the specific file process and reports the file needs to have fingerprint(s) created. Following the return of fingerprint(s) to compare, in step 009 the comparison algorithms processes the relationship and statistical analyses between fingerprints. After the analyses are complete, step 009 pushes the comparison report(s) for storage in step 010. The fingerprint storage API (003) is used to request and store the comparison report(s) in primary storage at step 004 and step 005. Once the comparison report(s) are stored in primary storage, the new comparison report(s) are stored in the API's cache in step 006 and step 007 for faster lookups.

External APIs are necessary for external systems to access the fingerprint(s) and/or report comparison. This is accomplished via a request to the Fingerprint API at step 01. This API, in turn, attempts to retrieve the data via a call to the Fingerprint Storage API (003) in step 012. That call causes the system to first check the API's cache in step 006 and 007. A cache miss then leads to a request to retrieve the fingerprint(s) and/or report comparison data from storage through steps 004 and 005.

Unless otherwise stated, all technical and scientific terms used herein have the same meaning as commonly understood by one of ordinary skill in the art to which this invention belongs. All terms used herein should be interpreted in the broadest possible manner consistent with the context. When a grouping is used herein, all individual members of the group and all combinations and subcombinations possible of the group are intended to be individually included in the disclosure. All references cited herein are hereby incorporated by reference to the extent that there is no inconsistency with the disclosure of this specification. If a range is expressed herein, such range is intended to encompass and disclose all sub-ranges within that range and all particular points within that range.

The present invention has been described with reference to certain preferred and alternative embodiments that are intended to be exemplary only and not limiting to the full scope of the present invention, as set forth in the appended claims.

The invention claimed is:

1. A method of fingerprinting for dynamic structured databases, the method comprising the steps of:
dividing a structured database into a plurality of subsets, wherein each of the plurality of subsets comprise columns in the structured database;

deriving a fingerprint for each of the plurality of subsets;
combining the fingerprint for each of the plurality of subsets to create a first fingerprint for the structured database;
applying a first timestamp to the first fingerprint for the structured database;
at a later time after changes occur in the structured database, again dividing the structured database into a plurality of subsets and deriving the fingerprint for each of the plurality of subsets, then combining the fingerprints for each of the plurality of subsets to create a second fingerprint for the structured database;
applying a second timestamp to the second fingerprint for the structured database; and
performing a time dimension analysis using the first fingerprint and second fingerprint in order to account for time drift within the structured database.

2. The method of claim 1, further comprising the step of profiling each of the plurality of columnar data sets by data type.

3. The method of claim 2, further comprising the step of pre-processing each of the plurality of columnar data sets.

4. The method of claim 3, further comprising the step of applying at least one of a plurality of statistical tests to the plurality of columnar data sets.

5. The method of claim 4, wherein at least one of the columnar data sets comprises a quantitative data set.

6. The method of claim 5, wherein the at least one of a plurality of statistical tests applied to the quantitative data set is selected from the set consisting of Mean, Median, Mode, Min, Max, Standard Deviation and Variance.

7. The method of claim 4, wherein at least one of the columnar data sets comprises a qualitative data set.

8. The method of claim 7, wherein at least one of the plurality of statistical tests applied to the plurality of columnar data sets is selected from the set consisting of two-sample Chi Square, Chi Square Goodness of Fit, and Chi Square Test of Independence.

9. The method of claim 1, further comprising the step of comparing the first fingerprint for the structured database or the second fingerprint for the structured database or both the first fingerprint and second fingerprint for the structured database to a data owner fingerprint for a data owner structured database to determine if the structured database was derived from the data owner structured database.

10. A non-transitory computer-readable storage medium storing instructions that, when executed by a computer, cause it to:
divide a structured database into a plurality of subsets, wherein each of the plurality of subsets comprise columns in the structured database;
derive a fingerprint for each of the plurality of subsets;
combine the fingerprint for each of the plurality of subsets to create a fingerprint for the structured database;
apply a first timestamp to the first fingerprint for the structured database;
at a later time after changes occur in the structured database, again divide the structured database into a plurality of subsets and derive the fingerprint for each of the plurality of subsets, then combine the fingerprints for each of the plurality of subsets to create a second fingerprint for the structured database;
apply a second timestamp to the second fingerprint for the structured database; and
perform a time dimension analysis using the first fingerprint and second fingerprint in order to account for time drift within the structured database.

11. The non-transitory computer-readable storage medium of claim 10, further comprising stored instructions that, when executed by a computer, cause it to profile each of the plurality of columnar data sets by data type.

12. The non-transitory computer-readable storage medium of claim 11, further comprising stored instructions that, when executed by a computer, cause it to pre-process each of the plurality of columnar data sets.

13. The non-transitory computer-readable storage medium of claim 12, further comprising stored instructions that, when executed by a computer, cause it to apply at least one of a plurality of statistical tests to the plurality of columnar data sets.

14. The non-transitory computer-readable storage medium of claim 13, wherein at least one of the columnar data sets comprises a quantitative data set.

15. The non-transitory computer-readable storage medium of claim 14, wherein the at least one of a plurality of statistical tests applied to the quantitative data set is selected from the set consisting of Mean, Median, Mode, Min, Max, Standard Deviation and Variance.

16. The non-transitory computer-readable storage medium of claim 13, wherein at least one of the columnar data sets comprises a qualitative data set.

17. The non-transitory computer-readable storage medium of claim 16, wherein at least one of the plurality of statistical tests applied to the plurality of columnar data sets is selected from the set consisting of two-sample Chi Square, Chi Square Goodness of Fit, and Chi Square Test of Independence.

18. The non-transitory computer-readable storage medium of claim 10, further comprising stored instructions that, when executed by a computer, cause it to compare the first fingerprint for the structured database or the second fingerprint for the structured database or both the first fingerprint and second fingerprint for the structured database to a fingerprint for a data owner structured database to determine if the structured database was derived from the data owner structured database.

* * * * *